United States Patent
Liu et al.

(10) Patent No.: US 9,336,476 B1
(45) Date of Patent: May 10, 2016

(54) METHOD OF MAKING RFID DEVICES ON FABRICS BY STITCHING METAL WIRES

(71) Applicant: Flextronics AP, LLC, Broomfield, CO (US)

(72) Inventors: Weifeng Liu, Dublin, CA (US); Anwar Mohammed, San Jose, CA (US); Zhen Feng, San Jose, CA (US); Murad Kurwa, San Jose, CA (US)

(73) Assignee: Flextronics AP LLC, Broomfield, CO (US)

( * ) Notice: Subject to any disclaimer, the term of this patent is extended or adjusted under 35 U.S.C. 154(b) by 0 days.

(21) Appl. No.: 14/483,002

(22) Filed: Sep. 10, 2014

(51) Int. Cl.
 *G06K 19/077* (2006.01)

(52) U.S. Cl.
 CPC ...... *G06K 19/07754* (2013.01); *G06K 19/0776* (2013.01); *G06K 19/07762* (2013.01)

(58) Field of Classification Search
 CPC ................. G06K 19/07754; G06K 19/07762; G06K 19/0776
 See application file for complete search history.

(56) References Cited

U.S. PATENT DOCUMENTS

| | | | |
|---|---|---|---|
| 5,555,915 A | 9/1996 | Kanao | |
| 5,778,941 A | 7/1998 | Inada | |
| 6,103,971 A | 8/2000 | Sato et al. | |
| 6,172,344 B1 | 1/2001 | Gordon et al. | |
| 6,192,940 B1 | 2/2001 | Koma et al. | |
| 6,339,193 B1 | 1/2002 | Goett et al. | |
| 7,156,127 B2 | 1/2007 | Moulton et al. | |
| 7,234,831 B1 | 6/2007 | Hanley | |
| 7,494,238 B2 | 2/2009 | Kuo | |
| 7,735,523 B2 | 6/2010 | Smith et al. | |
| 8,283,602 B2 | 10/2012 | Augustine et al. | |
| 2002/0076948 A1 | 6/2002 | Farrell | |
| 2003/0098084 A1 | 5/2003 | Ragner et al. | |
| 2003/0111126 A1 | 6/2003 | Moulton | |
| 2004/0229533 A1 | 11/2004 | Braekevelt et al. | |
| 2005/0224993 A1 | 10/2005 | Manepalli et al. | |
| 2007/0001844 A1 | 1/2007 | Krill | |
| 2007/0089800 A1 | 4/2007 | Sharma | |
| 2008/0180242 A1* | 7/2008 | Cottingham | G06K 19/0723 340/539.12 |
| 2008/0258314 A1 | 10/2008 | Yoo | |
| 2008/0271220 A1 | 11/2008 | Chilton | |
| 2010/0117537 A1 | 5/2010 | Horppu et al. | |
| 2010/0199901 A1 | 8/2010 | Kang et al. | |
| 2010/0325770 A1 | 12/2010 | Chung | |
| 2011/0119812 A1 | 5/2011 | Genz | |
| 2011/0198118 A1 | 8/2011 | Fang et al. | |
| 2014/0103116 A1* | 4/2014 | Martin | H01Q 1/2225 235/488 |
| 2014/0209690 A1* | 7/2014 | Teng | G06K 19/027 235/492 |

* cited by examiner

*Primary Examiner* — Kristy A Haupt
(74) *Attorney, Agent, or Firm* — Haverstock & Owens LLP

(57) ABSTRACT

An RFID device assembly is fabricated by stitching an electrically conductive wire into a fabric as a pattern that forms an antenna. The two ends of the electrically conductive wire are positioned for coupling to antenna contact pads on an RFID device. The RFID device is attached to the fabric either before or after the electrically conductive wire is stitched to the fabric.

28 Claims, 4 Drawing Sheets

METHOD OF MAKING RFID DEVICES ON FABRICS BY STITCHING METAL WIRES

FIELD OF THE INVENTION

The present invention is generally directed to the field of RFID devices. More specifically, the present invention is directed to RFID devices and methods of making RFID devices on fabrics by stitching metal wires.

BACKGROUND OF THE INVENTION

Radio Frequency Identification (RFID) devices are being used in an ever increasing number of applications. Electronic devices in general are increasingly being developed so as to be worn by a user, such as in wearable electronics. Metal wires are commonly used as electrical conductors between electronic devices and as antennas for transmitting and receiving signals. As applied to wearable electronics, providing such electrical conductors is typically done using a separate electrical cable that includes a metal wire. However, having loose cables is often a nuisance and ungainly.

SUMMARY OF THE INVENTION

In an aspect, an RFID device assembly is disclosed. The RFID device assembly includes a fabric, an RFID device coupled to the fabric, and an electrically conductive wire intermixed with the fabric. The RFID device includes a first antenna contact pad and a second antenna contact pad. The electrically conductive wire has a pattern that forms an antenna. The electrically conductive wire has a first end coupled to the first antenna contact pad and a second end coupled to the second antenna contact pad.

In some embodiments, the electrically conductive wire is a metal wire. In some embodiments, the electrically conductive wire includes an insulation layer formed around the metal wire. In some embodiments, the electrically conductive wire is a magnet wire. In some embodiments, the fabric is made of cotton, wool, nylon or other synthetic material. In some embodiments, the electrically conductive wire is stitched to the fabric. In some embodiments, the electrically conductive wire is woven into the fabric. In some embodiments, the RFID device is coupled to the fabric such that the first antenna contact pad and the second antenna contact pad are facing the fabric, the first end and the second end of the electrically conductive wire is between the fabric and the RFID device, and the RFID device assembly further includes an electrically conductive adhesive that couples the first end of the electrically conductive wire to the first antenna contact pad and coupled the second end of the electrically conductive wire to the second antenna contact pad. In some embodiments, the electrically conductive adhesive couples the RFID device to the fabric. In some embodiments, the RFID device assembly also includes a non-electrically conductive adhesive that couples the RFID device to the fabric. In some embodiments, the RFID device is coupled to the fabric such that the first antenna contact pad and the second antenna contact pad are facing away from the fabric. In some embodiments, the first end of the electrically conductive wire is coupled to the first antenna contact pad and the second end of the electrically conductive wire is coupled to the second antenna contact pad by soldering or welding. In some embodiments, the RFID device assembly also includes an encapsulation layer over the RFID device.

In another aspect, a method of making an RFID device assembly is disclosed. The method includes coupling an RFID device to a fabric. The RFID device includes a first antenna contact pad and a second antenna contact pad, wherein the RFID device is coupled to the fabric such that the first antenna contact pad and the second antenna contact pad are facing away from the fabric. The method also includes intermixing an electrically conductive wire with the fabric. The electrically conductive wire has a pattern that forms an antenna. The electrically conductive wire has a first end coupled to the first antenna contact pad and a second end coupled to the second antenna contact pad. The method also includes coupling the first end of the electrically conductive wire to the first antenna contact pad and coupling the second end of the electrically conductive wire to the second antenna contact pad. In some embodiments, the RFID device is coupled to the fabric using an adhesive. In some embodiments, the first end of the electrically conductive wire is coupled to the first antenna contact pad and the second end of the electrically conductive wire is coupled to the second antenna contact pad by soldering or welding. In some embodiments, intermixing the electrically conductive wire with the fabric includes stitching the electrically conductive wire to the fabric. In some embodiments, intermixing the electrically conductive wire with the fabric includes weaving the electrically conductive wire to the fabric. In some embodiments, the method also includes adding an encapsulation layer over the RFID device.

In yet another aspect, another method of making an RFID device assembly is disclosed. The method includes intermixing an electrically conductive wire with the fabric. The electrically conductive wire has a pattern that forms an antenna. The electrically conductive wire has a first end coupled to the first antenna contact pad and a second end coupled to the second antenna contact pad. The method also includes applying an electrically conductive attach material to the first end and the second end of the electrically conductive wire. The method also includes coupling an RFID device to the electrically conductive wire. The RFID device includes a first antenna contact pad that is coupled to the first end of the electrically conductive wire and a second antenna contact pad that is coupled to the second end of the electrically conductive wire. In some embodiments, the RFID device is coupled to the fabric via the electrically conductive attach material. In some embodiments, the method also includes applying a non-electrically conductive attach material to the RFID device prior to coupling the RFID device to the electrically conductive wire, wherein the non-electrically conductive attach material couples the RFID device to the fabric. In some embodiments, the method also includes applying a non-electrically conductive attach material to the fabric prior to coupling the RFID device to the electrically conductive wire, wherein the non-electrically conductive attach material couples the RFID device to the fabric. In some embodiments, the method also includes curing the electrically conductive attach material after coupling the RFID device to the electrically conductive wire. In some embodiments, intermixing the electrically conductive wire with the fabric includes stitching the electrically conductive wire to the fabric. In some embodiments, intermixing the electrically conductive wire with the fabric includes weaving the electrically conductive wire to the fabric. In some embodiments, the method also includes adding an encapsulation layer over the RFID device.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
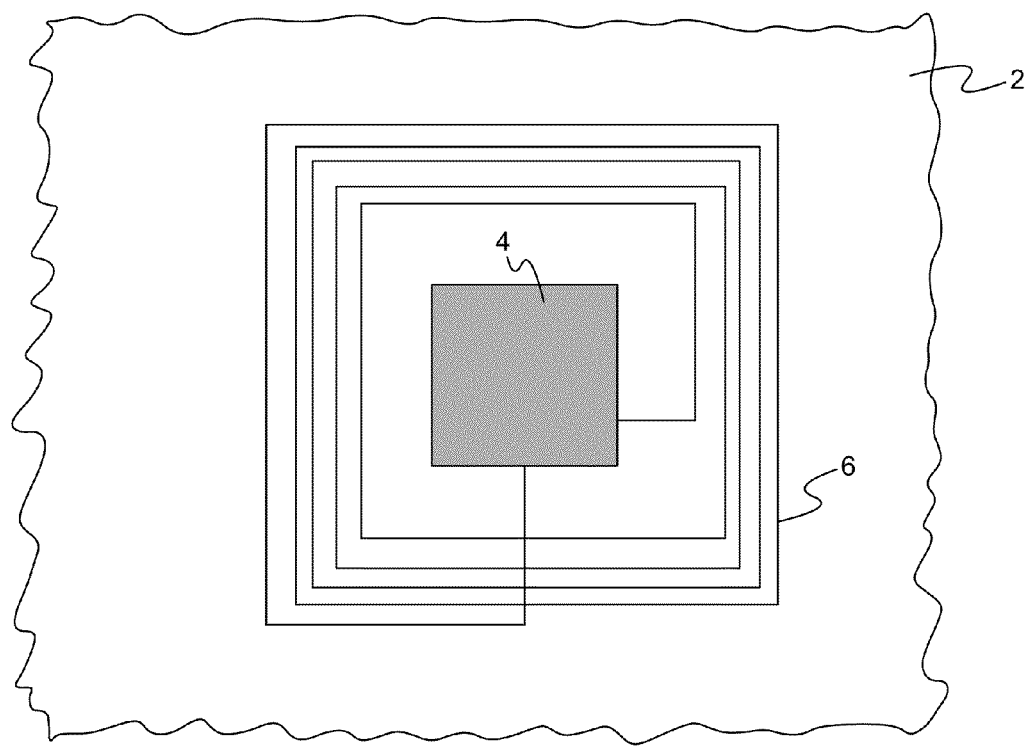
FIG. 1 illustrates an RFID device assembly according to an embodiment.

Embodiments of the present application are directed to an RFID device assembly. Those of ordinary skill in the art will realize that the following detailed description of the RFID device assembly is illustrative only and is not intended to be in any way limiting. Other embodiments of the RFID device assembly will readily suggest themselves to such skilled persons having the benefit of this disclosure.

Reference will now be made in detail to implementations of the RFID device assembly as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As used herein, the term "fabric" generally applies to cloth or other similar materials made of threads, fibers, filaments or the like, generally referred to herein as "threads". Materials used for threads can include, but are not limited to, cotton, wool, nylon, polyester or other synthetic materials.

As used herein, the term "intermix" generally refers to mixing or blending together and is applied herein to describe the manner by which an electrically conductive wire is integrated as part of a fabric. The electrically conductive wire is intermixed with the fabric using conventional methodologies, for example weaving, stitching, felting or knitting, and is intended to include, but not be limited to, such similar concepts as intertwining, interweaving, interspersing, interlacing, intermingling and the like of the electrically conductive wire and fabric threads. Although the following description refers to "stitching" the electrically conductive wire onto the fabric, it is intended that such description is intended to refer to the general concept of intermixing the insulated wire and the fabric threads.

In some embodiments, the electrically conductive wire is a metal wire. The metal wire can be made of pure metal, such as gold, copper or aluminum, a metal alloy, or some combination of pure metals, metal alloys or combination of pure metals and metal alloys. In some embodiments, the electrically conductive wire is insulated. In other embodiments, the electrically conductive wire is not insulated. In some embodiments, the electrically conductive wire is a magnet wire, also referred to as enameled wire. Magnet wire is typically made of a copper or aluminum wire coated with a very thin layer of insulation. Magnet wire is referred to as "magnet" due to its electromagnetic applications. Magnet wires can be used in the construction of transformers, inductors, motors, speakers, hard disk head actuators, potentiometers, electromagnets, and other applications which require tight coils of wire. The metal wire itself is most often fully annealed, electrolytically refined copper. Smaller diameter magnet wire usually has a round cross section. An example of this kind of wire is used for things such as electric guitar pickups. Thicker magnet wire is often square or rectangular with rounded corners to provide more current flow per coil length.

In some embodiments, magnet wire includes one to four layers of polymer film insulation, often of two different compositions, to provide a tough, continuous insulating layer. Materials used for magnet wire insulating films can include, but are not limited to, polyvinyl formal (Formvar™), polyurethane, polyamide, polyester, polyester-polyimide, polyamide-polyimide (or amide-imide), and polyimide. Polyimide insulated magnet wire is capable of operation at up to 250° C. In other embodiments, different types of insulation are used including, but not limited to, fiberglass yarn with varnish, aramid paper, kraft paper, mica, and polyester film. It is understood that are types of magnet wires can be used, for example a silver wire having various insulators, such as polytetrafluoroethylene (Teflon™), such as that found in the audio industry.

For ease of manufacturing, newer magnet wires can have insulation that acts as a flux when burnt during soldering. This results in magnet wires having electrical connections at the ends that can be made without stripping off the insulation first. Older magnet wires do not have this type of insulation and can require sandpapering or scraping to remove the insulation before soldering.

Like other types of wire, magnet wire is classified by diameter (AWG number or SWG) or area (square millimeters), temperature and insulation. Magnet wire breakdown voltage depends on the thickness of the covering, which can be of 3 types: Grade 1, Grade 2 and Grade 3. Higher grades have thicker insulation and thus higher breakdown voltages. The temperature class indicates the temperature of the wire where it has a 20,000 hour service life. At lower temperatures the service life of the wire is longer (about a factor 2 for every 10° C. lower temperature). Common temperature classes are 105° C., 130° C., 155° C., 180° C. and 220° C.

An RFID device assembly is fabricated by stitching an electrically conductive wire into a fabric as a pattern that forms an antenna. The two ends of the electrically conductive wire are positioned for coupling to antenna contact pads on an RFID device. The RFID device is attached to the fabric either before or after the electrically conductive wire is stitched to the fabric. FIG. 1 illustrates an RFID device assembly according to an embodiment. The RFID device assembly includes an electrically conductive wire 6 stitched onto a fabric 2. The electrically conductive wire 6 is stitched as a pattern that forms an antenna for an RFID device 4 coupled to the fabric 2. The specific placement, orientation and pattern of the electrically conductive wire 6 is application specific. FIG. 1 show the antenna as a spiral formed as a series of straight lines. It is understood that alternative patterns can be formed including, but not limited to, an alternative linear pattern, a non-linear pattern such as a curved spiral, some combination of linear and non-linear patterning, or generally any pattern that can be used as an antenna. The RFID device 4 can be any conventional RFID device including, but not limited to, an RFID semiconductor chip. The RFID device 4 includes two antenna contact pads (underside of RFID device 4 in this embodiment), one antenna contact pad coupled to a corresponding end of the electrically conductive wire 6.

Figure 2:
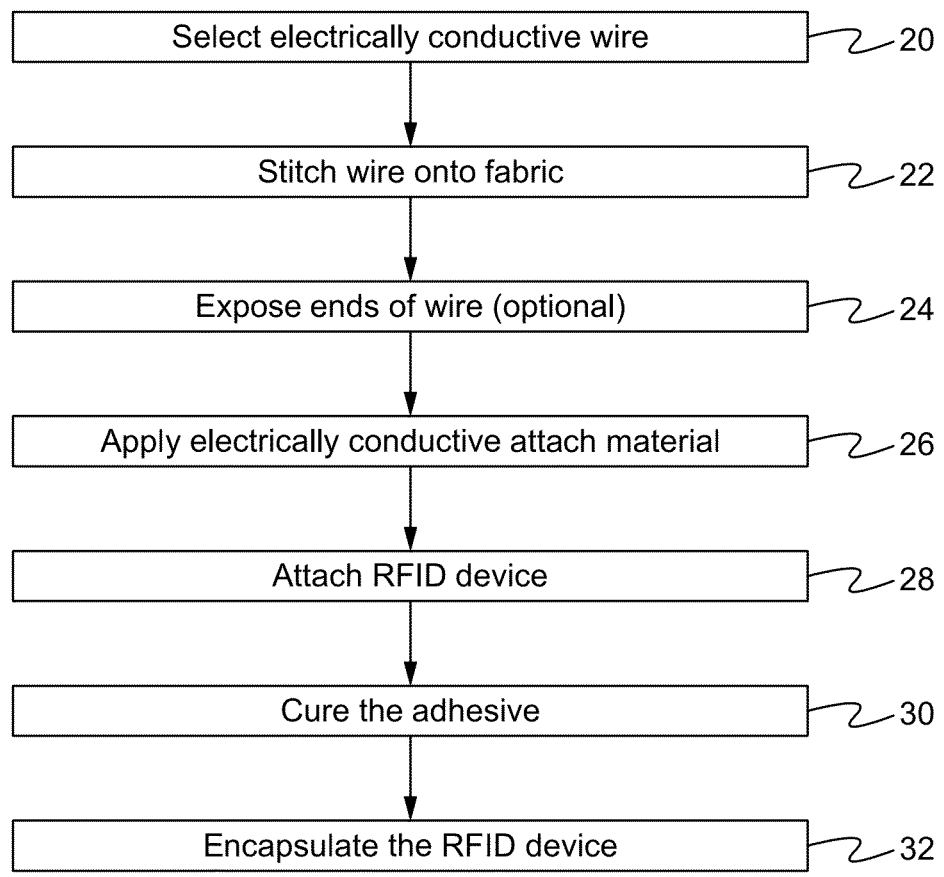
FIG. 2 illustrates a method of fabricating the RFID device assembly of FIG. 1 according to an embodiment.

FIG. 2 illustrates a method of fabricating the RFID device assembly of FIG. 1 according to an embodiment. At a step 20, the electrically conductive wire 6 is selected. At the step 22, the electrically conductive wire 6 is stitched onto the fabric 2 based on a design pattern that forms an antenna for the RFID device 4.

At the step 24, an optional step is performed of exposing the two ends of the stitched electrically conductive wire 6. If the electrically conductive wire 6 selected at the step 20 is insulated, then the insulation must be removed at the two ends to expose the underling electrically conductive portion, such as a metal wire. In some embodiments, a laser is used to strip the insulation materials. It is understood that other conventional techniques can be used to remove the insulation material at the two ends of the electrically conductive wire.

At the step 26, an electrically conductive attach material is applied. In some embodiments, the electrically conductive attach material is an electrically conductive adhesive. In some embodiments, the electrically conductive attach material is applied to the two ends of the electrically conductive wire 6. In other embodiments, the electrically conductive attach material is applied to the two antenna contact pads on the RFID device 4. At the step 28, the RFID device 4 is attached. The RFID device 4 is aligned with the two ends of the electrically conductive wire 6 such that the two antenna contact pads on the RFID device 4 are aligned with the two ends of the electrically conductive wire 6.

At the step 30, the electrically conductive attach material is cured or otherwise processed to establish a mechanical and electrical connection between the antenna contact pads on the RFID device 4 and the two ends of the electrically conductive wire 6. In the case of adhesive, excess electrically conductive adhesive may be applied at the antenna contact pads and/or the two ends of the electrically conductive wire such that the electrically conductive adhesive also contact the fabric and/or surface of the RFID device proximate the antenna contact pads, thereby providing an additional mechanical coupling for securing the RFID device 4 to the fabric 2. In some embodiments, the surface of the RFID device 4 that includes the antenna contact pads is electrically insulated and the electrically conductive adhesive can be applied to any portion of that surface to further secure the RFID device 4 to the fabric 2. In other embodiments, certain portions of the surface of the RFID device 4 that includes the antenna contact pads may be electrically sensitive. In this case, a non-electrically conductive adhesive, such as silicone adhesive or epoxy-based adhesive, can be applied to any or some of those portions, or proximate portions, so as to further secure the RFID device 4 to the fabric 2 yet maintain the desired electrical isolation. The type of attach material used, whether it is electrically conductive or non-electrically conductive, is dependent on the material used as the fabric, the material used as the electrically conductive wire and the ability of the attach material to attach to these materials.

At the step 32, an encapsulation layer is applied over the RFID device 4. In some embodiments, the encapsulation layer is also applied over the electrically conductive wire 6. The encapsulation layer can be made of any conventional material used for encapsulation or molding including, but not limited to, polymer, silicone, urethane or epoxy.

The method of fabrication the RFID device assembly described above is directed to using an electrically conductive adhesive to electrically couple an antenna contact pad and an end of the electrically conductive wire. It is understood that other conventional coupling methods can be used, including, but not limited to, soldering and welding.

Figure 3:
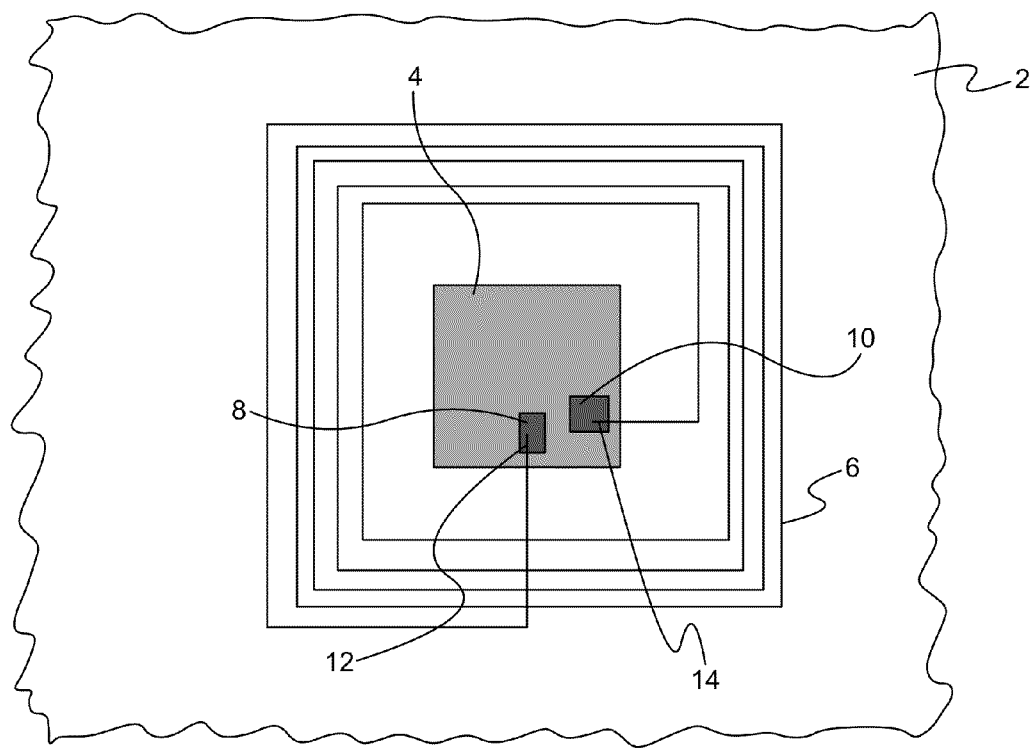
FIG. 3 illustrates an RFID device assembly according to another embodiment.

The RFID device assembly can be alternatively fabricated with the RFID device flipped upside down relative to the position shown in FIG. 1. FIG. 3 illustrates an RFID device assembly according to another embodiment. The RFID device assembly shown in FIG. 3 is similar to that of the RFID device assembly shown in FIG. 1 except that the RFID 4 is flipped upside down relative to the fabric 2 such that the antenna contact pads 8 and 10 are exposed. The electrically conductive wire 6 is stitched to form the antenna for the RFID device 4. A first end 12 of the electrically conductive wire 6 is coupled to the antenna contact pad 8 and a second end 14 of the electrically conductive wire 6 is coupled to the antenna contact pad 10.

Figure 4:
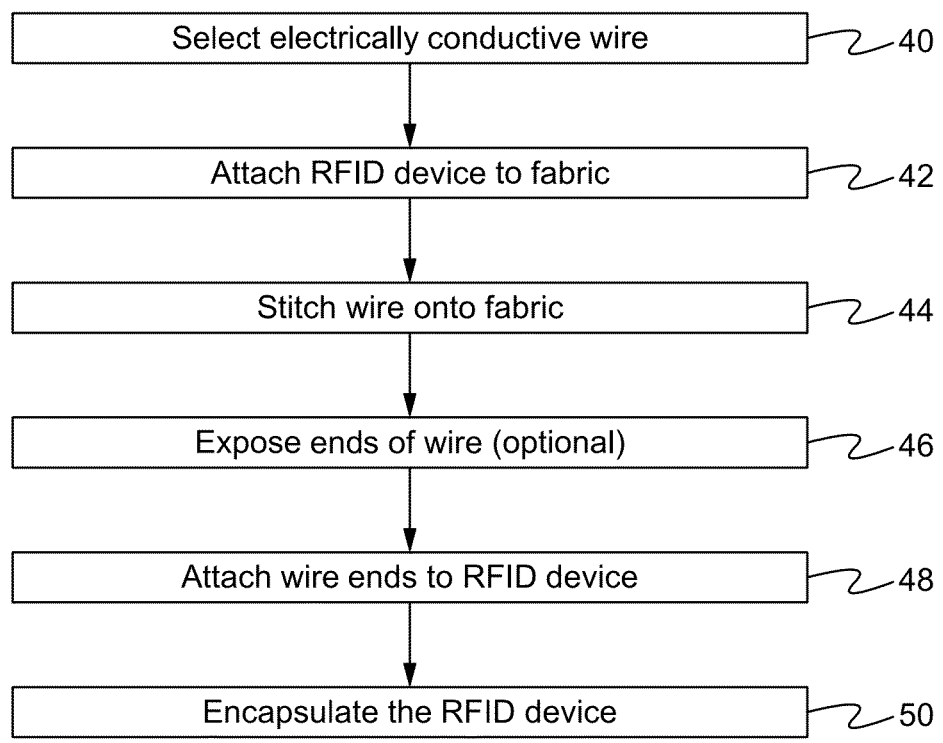
FIG. 4 illustrates a method of fabricating the RFID device assembly of FIG. 3 according to an embodiment.

FIG. 4 illustrates a method of fabricating the RFID device assembly of FIG. 3 according to an embodiment. At a step 40, the electrically conductive wire 6 is selected. At the step 42, the RFID device 4 is attached to the fabric 2. The RFID device 4 is attached such that the surface including the antenna contact pads 8 and 10 is turned away from the fabric 2, thereby exposing the antenna contact pads 8 and 10. An attach material is used to attach the RFID device 4 to the fabric 2. In some embodiments, the attach material is a silicone adhesive or epoxy-based adhesive.

At the step 44, the electrically conductive wire 6 is stitched onto the fabric 2 based on a design pattern that forms an antenna for the RFID device 4. The electrically conductive wire 6 is stitched such that the two ends 12 and 14 are aligned with antenna contact pads 8 and 10, respectively.

At the step 46, an optional step is performed of exposing the two ends of the stitched electrically conductive wire 6. If the electrically conductive wire 6 selected at the step 40 is insulated, then the insulation must be removed at the two ends to expose the underling electrically conductive portion, such as a metal wire. In some embodiments, a laser is used to strip the insulation materials. It is understood that other conventional techniques can be used to remove the insulation material at the two ends of the electrically conductive wire.

At the step 48, the first end 8 of the electrically conductive wire 6 is coupled to the antenna contact pad 8 and the second end 14 of the electrically conductive wire 6 is coupled to the antenna contact pad 10. In some embodiments, the wire ends are soldered to the antenna contact pads. It is understood that other conventional techniques can be used to mechanically and electrically couple the wire ends to the antenna contact pads.

At the step 50, an encapsulation layer is applied over the RFID device 4 including the antenna contact pads 8 and 10 and at least the wire ends 12 and 14. In some embodiments, the encapsulation layer is also applied over the remainder of the electrically conductive wire 6. The encapsulation layer can be made of any conventional material used for encapsulation or molding including, but not limited to, polymer, silicone, urethane or epoxy.

The present application has been described in terms of specific embodiments incorporating details to facilitate the understanding of the principles of construction and operation of the RFID device assembly. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An RFID device assembly comprising:
   a. a fabric;
   b. an RFID device coupled to the fabric, wherein the RFID device comprises a first antenna contact pad and a second antenna contact pad; and
   c. an electrically conductive wire intermixed with the fabric, wherein the electrically conductive wire has a pattern that forms an antenna, further wherein the electrically conductive wire has a first end electrically coupled to the first antenna contact pad and a second end electrically coupled to the second antenna contact pad.

2. The RFID device assembly of claim 1 wherein the electrically conductive wire comprises a metal wire.

3. The RFID device assembly of claim 2 wherein the electrically conductive wire further comprises insulation layer formed around the metal wire.

4. The RFID device assembly of claim 1 wherein the electrically conductive wire comprises a magnet wire.

5. The RFID device assembly of claim 1 wherein the fabric comprises cotton, wool, nylon or other synthetic material.

6. The RFID device assembly of claim 1 wherein the electrically conductive wire is stitched to the fabric.

7. The RFID device assembly of claim 1 wherein the electrically conductive wire is woven into the fabric.

8. The RFID device assembly of claim 1 wherein the RFID device is coupled to the fabric such that the first antenna contact pad and the second antenna contact pad are facing the fabric, the first end and the second end of the electrically conductive wire is between the fabric and the RFID device, and RFID device assembly further comprises an electrically conductive adhesive that electrically couples the first end of the electrically conductive wire to the first antenna contact pad and electrically couples the second end of the electrically conductive wire to the second antenna contact pad.

9. The RFID device assembly of claim 8 wherein the electrically conductive adhesive couples the RFID device to the fabric.

10. The RFID device assembly of claim 9 further comprising a non-electrically conductive adhesive that couples the RFID device to the fabric.

11. The RFID device assembly of claim 1 wherein the RFID device is coupled to the fabric such that the first antenna contact pad and the second antenna contact pad are facing away from the fabric.

12. The RFID device assembly of claim 11 wherein the first end of the electrically conductive wire is coupled to the first antenna contact pad and the second end of the electrically conductive wire is coupled to the second antenna contact pad by soldering or welding.

13. The RFID device assembly of claim 11 further comprising an adhesive to couple the RFID device to the fabric.

14. The RFID device assembly of claim 1 further comprising an encapsulation layer over the RFID device.

15. A method of making an RFID device assembly, the method comprising:
   a. coupling an RFID device to a fabric, wherein the RFID device comprises a first antenna contact pad and a second antenna contact pad, wherein the RFID device is coupled to the fabric such that the first antenna contact pad and the second antenna contact pad are facing away from the fabric;
   b. intermixing an electrically conductive wire with the fabric, wherein the electrically conductive wire has a pattern that forms an antenna, further wherein the electrically conductive wire has a first end aligned with the first antenna contact pad and a second end aligned with the second antenna contact pad; and
   c. electrically coupling the first end of the electrically conductive wire to the first antenna contact pad and electrically coupling the second end of the electrically conductive wire to the second antenna contact pad.

16. The method of claim 15 wherein the RFID device is coupled to the fabric using an adhesive.

17. The method of claim 15 wherein the first end of the electrically conductive wire is coupled to the first antenna contact pad and the second end of the electrically conductive wire is coupled to the second antenna contact pad by soldering or welding.

18. The method of claim 15 wherein intermixing the electrically conductive wire with the fabric comprises stitching the electrically conductive wire to the fabric.

19. The method of claim 15 wherein intermixing the electrically conductive wire with the fabric comprises weaving the electrically conductive wire to the fabric.

20. The method of claim 15 further comprising adding an encapsulation layer over the RFID device.

21. A method of making an RFID device assembly, the method comprising:
   a. intermixing an electrically conductive wire with a fabric, wherein the electrically conductive wire has a pattern that forms an antenna, further wherein the electrically conductive wire has a first end and a second end;
   b. applying an electrically conductive attach material to the first end and the second end of the electrically conductive wire; and
   c. electrically coupling an RFID device to the electrically conductive wire, wherein the RFID device comprises a first antenna contact pad that is electrically coupled to the first end of the electrically conductive wire and a second antenna contact pad that is electrically coupled to the second end of the electrically conductive wire.

22. The method of claim 21 wherein the RFID device is coupled to the fabric via the electrically conductive attach material.

23. The method of claim 21 further comprising applying a non-electrically conductive attach material to the RFID device prior to coupling the RFID device to the electrically conductive wire, wherein the non-electrically conductive attach material couples the RFID device to the fabric.

24. The method of claim 21 further comprising applying a non-electrically conductive attach material to the fabric prior to coupling the RFID device to the electrically conductive wire, wherein the non-electrically conductive attach material couples the RFID device to the fabric.

25. The method of claim 21 further comprising curing the electrically conductive attach material after coupling the RFID device to the electrically conductive wire.

26. The method of claim 21 wherein intermixing the electrically conductive wire with the fabric comprises stitching the electrically conductive wire to the fabric.

27. The method of claim 21 wherein intermixing the electrically conductive wire with the fabric comprises weaving the electrically conductive wire to the fabric.

28. The method of claim 21 further comprising adding an encapsulation layer over the RFID device.

* * * * *